United States Patent [19]
Lenhart et al.

[11] Patent Number: 5,617,006
[45] Date of Patent: Apr. 1, 1997

[54] RECHARGE PROFILE FOR SPACECRAFT NI/H$_2$ BATTERIES

[75] Inventors: Stephen J. Lenhart, Mountain View; John C. Hall, Saratoga; Anthony Z. Applewhite, Atherton, all of Calif.

[73] Assignee: Space Systems/Loral, Inc., Palo Alto, Calif.

[21] Appl. No.: 637,171

[22] Filed: Apr. 24, 1996

[51] Int. Cl.$^6$ .............................. H01M 12/06; H02J 7/00
[52] U.S. Cl. ................................ 320/21; 320/30; 320/35; 320/39; 429/50
[58] Field of Search .................................. 320/5, 21, 22, 320/23, 30, 31, 32, 35, 36, 39, 40, 48; 429/50, 101, 120

[56] References Cited

U.S. PATENT DOCUMENTS

| | | | |
|---|---|---|---|
| 4,385,269 | 5/1983 | Aspinwall et al. | 320/21 X |
| 4,392,101 | 7/1983 | Saar et al. | 320/39 X |
| 5,329,219 | 7/1994 | Garrett | 320/22 |
| 5,395,706 | 3/1995 | Hall | 429/50 |
| 5,395,708 | 3/1995 | Hall | 429/120 |
| 5,396,163 | 3/1995 | Nor et al. | 320/21 |
| 5,429,888 | 7/1995 | Hall | 429/50 |
| 5,463,305 | 10/1995 | Koenck | 320/21 |
| 5,493,199 | 2/1996 | Koenck et al. | 320/35 |

*Primary Examiner*—Edward Tso
*Attorney, Agent, or Firm*—Perman & Green

[57] ABSTRACT

An improved method of charging a rechargeable nickel/hydrogen battery comprises the steps of applying a charging current to the battery resulting in a substantially full state of charge, then for a period up to approximately 60 minutes before the onset of discharging, applying a boost charging current at a rate in the range of approximately C to C/20 for a duration up to approximately 60 minutes. The charging of the battery before applying the boost step may include the application of a taper charging current. Also, at the end of the taper charging step and immediately prior to the boost charge, a trickle charging current may be applied at a rate in the range of approximately C/80 to C/500. In another instance, when the battery has been charged to about 70% to 95% of a full state of charge, the linearly decreasing taper charge may be applied until a final desired recharge ratio is reached. Thereafter, up to a duration of approximately 60 minutes before the onset of discharging, the boost charging current may be applied at a rate in the range of approximately C to C/20 for part of or for the entire duration. The timed sequence of the initial high rate charge, the taper charge, the trickle charge, and the boost charge, in conjunction with proper control of battery temperature and recharge ratio has been found to increase overall battery capacity by approximately 10% to 30%.

20 Claims, 1 Drawing Sheet

RECHARGE PROFILE FOR SPACECRAFT NI/H₂ BATTERIES

BACKGROUND OF THE INVENTION

1. Field of the Invention

The present invention relates to an improved battery charging technique for rechargeable spacecraft nickel/hydrogen (Ni/H$_2$) batteries.

2. Discussion of the Prior Art Battery charge and discharge rates are often expressed in a C/X notation (e.g. C/2). This notation, which will be employed throughout this disclosure, normalizes the rates so that they are independent of battery capacity or battery size. In the numerator, battery capacity C is usually expressed in Ah (Ampere-hours), which is a quantity of charge. The denominator X represents the number of hours required to either charge or discharge the full battery capacity. Therefore, C/x has units of Amperes, which is a charge or discharge rate. For example, a C/22 discharge rate means that full battery capacity will be discharged in two hours. If a particular battery is rated at 100 Ah capacity, then a C/22 discharge rate would be 50 Amperes and the battery would be fully discharged in two hours.

Another term commonly used in this disclosure is "recharge ratio". The recharge ratio may be defined as the ratio of the quantity of charge, measured in ampere hours, imparted to the battery to the quantity of charge, also measured in ampere hours, available for discharge by the battery.

Commonly assigned U.S. Pat. No. 5,395,706 to Hall, the entire disclosure of which is hereby incorporated into the instant disclosure by reference, describes a unique method of operating a nickel-hydrogen battery when the battery is less than fully charged and results in increasing the charge capacity of the battery. The method comprises the step of completing the recharging process for the battery at a temperature $T_1$ in the range of approximately −10° C. down to −30° C. which is lower than a temperature $T_2$ in the range of approximately −10° C. to +50° C. at which discharge begins As related in the patent, it is desirable, subsequently, to heat the battery to the temperature $T_2$ in readiness for discharge. A preferred recharge temperature is less than approximately −10° C.

Ni/H$_2$ batteries will charge to a higher state-of-charge and will store more electrical capacity if they charge with high current or power. However, higher charging currents also cause an increase in the rate of a parasitic electrochemical reaction that evolves oxygen gas (near end-of-charge), which generates heat, wastes power and energy, and shortens the charge/discharge life of the battery. Today's geosynchronous earth orbit (GEO) spacecraft Ni/H$_2$ batteries may undergo charge/discharge cycling for 15 or more years. This requirement dictates low charging currents to achieve battery life requirements at the expense of capacity.

Some LEO (low earth orbit) satellite applications require both rapid charge rates and long battery cycle life. To minimize the adverse effects of the high charge rates on cycle life, LEO spacecraft batteries sometimes charge at a high rate initially while deleterious gas evolution reaction rates are low, and then the charge current steps down or tapers down to a lower value during overcharging when gassing rates increase. After charging and properly overcharging, Ni/H$_2$ and NiCd batteries are often trickle charged at very low rates until discharging begins. This charging method is baselined for the Space Station batteries. Similar charging techniques apply to lead/acid and other batteries in terrestrial applications, and commercial battery charge controllers automatically reduce charge current at a preset charging voltage. However, reducing charge current near end-of-charge does not optimize battery capacity. Also, initial high rate charging followed by taper charging is not used commonly, if ever, for GEO spacecraft battery charge profiles.

As described in the Hall patent, the capacity of Ni/H$_2$ batteries can also be increased substantially by recharging at a significantly lower temperature than the discharging temperature. To implement this technology practically on a satellite, the heat removal radiator size must be increased in order to cool the battery to its optimum recharge temperature. However, even with a larger radiator, optimum recharge temperatures cannot be practically achieved using conventional constant current or constant power recharge methods. Battery heating, especially during overcharge, will raise temperatures beyond optimum for maximum capacity storage.

The present invention is an improvement on the Hall patent. While utilizing the basic teachings of the Hall technique, the present invention provides more specific operating steps which further advance that technique, making it even more valuable.

SUMMARY OF THE INVENTION

Thus, it was in light of the Hall patent that the present invention was conceived and has now been reduced to practice.

According to the invention, an improved method of charging a rechargeable nickel/hydrogen battery comprises the steps of applying a charging current to the battery resulting in a substantially full state of charge, then for a period up to approximately 60 minutes before the onset of discharging, applying a boost charging current at a rate in the range of approximately C to C/20 for a duration up to approximately 60 minutes. By so doing, the capacity of the battery may be increased by up to approximately 3% to 5%. This method is applicable regardless of the method used to bring the battery to its original "substantially full state of charge" or whether a trickle charge is applied after recharge. The charging of the battery before applying the boost step may include the application of a taper charging current, perhaps at a substantially linearly decreasing rate. Also, at the end of the taper charging step and immediately prior to the boost charge, a trickle charging current may be applied at a rate in the range of approximately C/80 to C/500. In another instance, when the battery has been charged to about 70% to 95% of a full state of charge, the linearly decreasing taper charge may be applied until a final desired recharge ratio is reached. Thereafter, up to a duration of approximately 60 minutes before the onset of discharging, the boost charging current may be applied at a rate in the range of approximately C to C/20 for part of or for the entire duration. The timed sequence of the initial high rate charge, the taper charge, the trickle charge, and the boost charge, in conjunction with proper control of battery temperature and recharge ratio has been found to increase overall battery capacity by approximately 10% to 30%.

The elevated charging voltage associated with high charging currents and low temperatures accesses and charges active material in the electrodes that otherwise would not participate in electrochemical charging processes. Battery capacity increases because more active material charges, or because the active material charges to a higher average valence state. In either case, the end-of-charge voltage or the maximum charge voltage should qualitatively predict battery capacity under normal test conditions. Higher Ni/H$_2$ battery voltages near end-of-charge increase stored capacity, but also increase the rate of the parasitic oxygen evolution reaction:

$$4OH \rightarrow O_2 2H_2O + 4e$$

At high overcharge rates, oxygen gas bubbles nucleate and grow rapidly within the pores of the positive electrode, and are thought to produce mechanical stresses that possibly damage the positive electrode structure and affect life. The negative electrodes and separators can also be damaged. The oxygen gas generated near end-of-charge recombines with hydrogen gas at the negative electrodes to produce water and intense, localized, heating. Battery temperatures rise and cooling system loads increase substantially as the battery approaches full charge and enters overcharge. Higher temperatures reduce charging efficiency, promote more oxygen evolution, generate still more heat, and have other deleterious effects.

One part of the present invention includes a step to high current at the end of the trickle charge portion of the charging current/time profile in order to elevate battery capacity just prior to discharge. It is possible that a current step elsewhere in the overcharging or trickle charging portion of the charge profile might also be effective.

If utilized properly, the current step increases capacity without impacting battery life, as described in more detail below. The increased battery capacity-translates to a reduced battery mass and launch cost. For example, with a 4% typical capacity increase on a 27 cell battery with 120 Ah cells, one or two positive/negative electrode plate pairs could be removed, and two to four kilograms or $90K to $180K, based on a $45K/kg launch cost, could be saved on each two battery spacecraft.

In the first part of the present invention, a charging profile can be completed normally, using, for example, constant current charge, constant power charge, constant power with taper charge, and the like, after which the battery is switched to trickle charge. Up to approximately 60 minutes before the end of the trickle charge period (or beginning of eclipse discharge in the event of a space-oriented battery), the battery charging current steps from a low trickle charge current to a high current. In laboratory tests, a current step in the trickle charge period has created additional battery capacity without causing significant oxygen evolution, heating, and adverse life impacts for at least 30 minutes.

In the current steptests conducted to date, trickle charge currents are typically near the C/100 rate (i.e. the current required in amperes to deliver the cell capacity, C in ampere hours, in 100 hours). The trickle charge current steps to the maximum current provided by the spacecraft power system, or about C/10. Higher current steps should produce additional capacity because of the higher voltage, but this has not been investigated.

The placement of the current step late in the trickle charge portion of the charging profile is not obvious. If anything, a normal battery charge controller, will reduce battery charging current during overcharge, and may reduce it further during trickle charge. Normally, a battery in trickle charge is thought to be fully charged, and increasing the charging current will just create more gassing and heat. Trickle charging should create only a small Ni/H$_2$ cell pressure increase (that is approximately proportional to battery capacity), because essentially all of the charging current evolves oxygen gas which is recombined with hydrogen to form water. However, in laboratory tests, the stepped current is stored at almost 100% efficiency for approximately the first 30 minutes, and pressure increases are larger than expected. Therefore, the charge input associated with the current step does not generate large amounts of oxygen gas and heat, and life impacts should be negligible.

In a second part of the present invention, a Ni/H$_2$ battery charging profile is claimed, which (a) promotes post discharge battery cool down, (b) minimizes end-of-charge temperature rise, and (c) improves recharge capacity. The basis of the approach is:

(1) Recharge current is maximized during the early efficient recharge period after discharge. This process promotes battery cool down as the early recharge reaction is endothermic, or heat absorbing.

(2) Approximately in the range of 70% to 95% of full charge, a taper charge is initiated which is intended to eventually achieve a final desired recharge ratio. The taper charge resulting in the desired recharge ratio reduces the rate of electrolysis heat at high state of recharge such that heat is more completely rejected by the space radiator and the battery temperature does not substantially increase.

The temperature/time profile resulting from the charging profile described above results in a battery temperature which is substantially less than normal spacecraft battery temperatures in the range of about 0° C. to 20° C., and the end-of-charge current step shows a temperature drop for about 30 minutes, which was not predicted by analysis (see FIG. 1). It is noteworthy that the battery heaters are turned off at the beginning of the current step.

In summary, the present disclosure presents a Ni/H$_2$ battery charging profile that optimizes low temperature charging and stored capacity. Initially, a high current/power charge promotes temperature drop. At about 70% to 95% of full charge, a taper charge to the final recharge ratio reduces heat generation and keeps battery temperatures low. Trickle charging at a low rate maintains stored capacity until the current steps to a high value up to about 60 minutes before the end of the trickle charge. The current step stores additional capacity at near 100% efficiency for about 30 minutes with a C/10 step height and does not adversely impact battery life.

Accordingly, it is a primary object of the invention to provide an improved battery charging technique for rechargeable spacecraft nickel/hydrogen (Ni/H$_2$) batteries.

Another object of the invention is to provide a more detailed battery charging technique as an improvement on that disclosed in U.S. Pat. No. 5,395,706 to Hall.

A further object of the invention is to provide such a battery charging technique according to which a charge current is applied to the battery after completion of a prior step of discharging the battery resulting in a full state of charge for the battery, then discharging the battery from the full state of charge, but in the range of approximately 10 to 60 minutes before the onset of the step of discharging the battery, applying to the battery a boost charging current for a duration in the range of approximately 10 to 60 minutes, thereby resulting in an increased battery capacity in the range of approximately 3% to 5%.

Still another object of the invention is to provide such a method of charging a rechargeable nickel/hydrogen battery wherein, after the initial high rate charge, a trickle recharge current is applied to the battery before the onset of the discharge step.

Yet another object of the invention is to provide such a battery recharging technique wherein the trickle recharge current is applied at a rate in the range of approximately c/80 to c/500.

Still a further object of the invention is to provide such a battery charging technique according to which, concurrent with the initial high rate charge and approximately at the time the battery temperature reaches a minimum value, temporarily applying heat to the battery for maintaining the temperature of the battery at that predetermined temperature. After the battery has reached a substantially full state of charge, heat is again applied to raise the battery temperature to a second predetermined value in order to prepare for discharge.

Yet a further object of the invention is to provide such a recharging technique which comprises the steps of first applying a charging current to the battery resulting in a substantially full state of charge, then at about 70% to 95% of a full state of charge for the battery, initiating application to the battery of a decreasing taper charge until a final desired recharge ratio is reached.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and, together with the description, serve to explain the principles of the invention in general terms.

DETAILED DESCRIPTION OF THE PREFERRED EMBODIMENT

Figure 1:
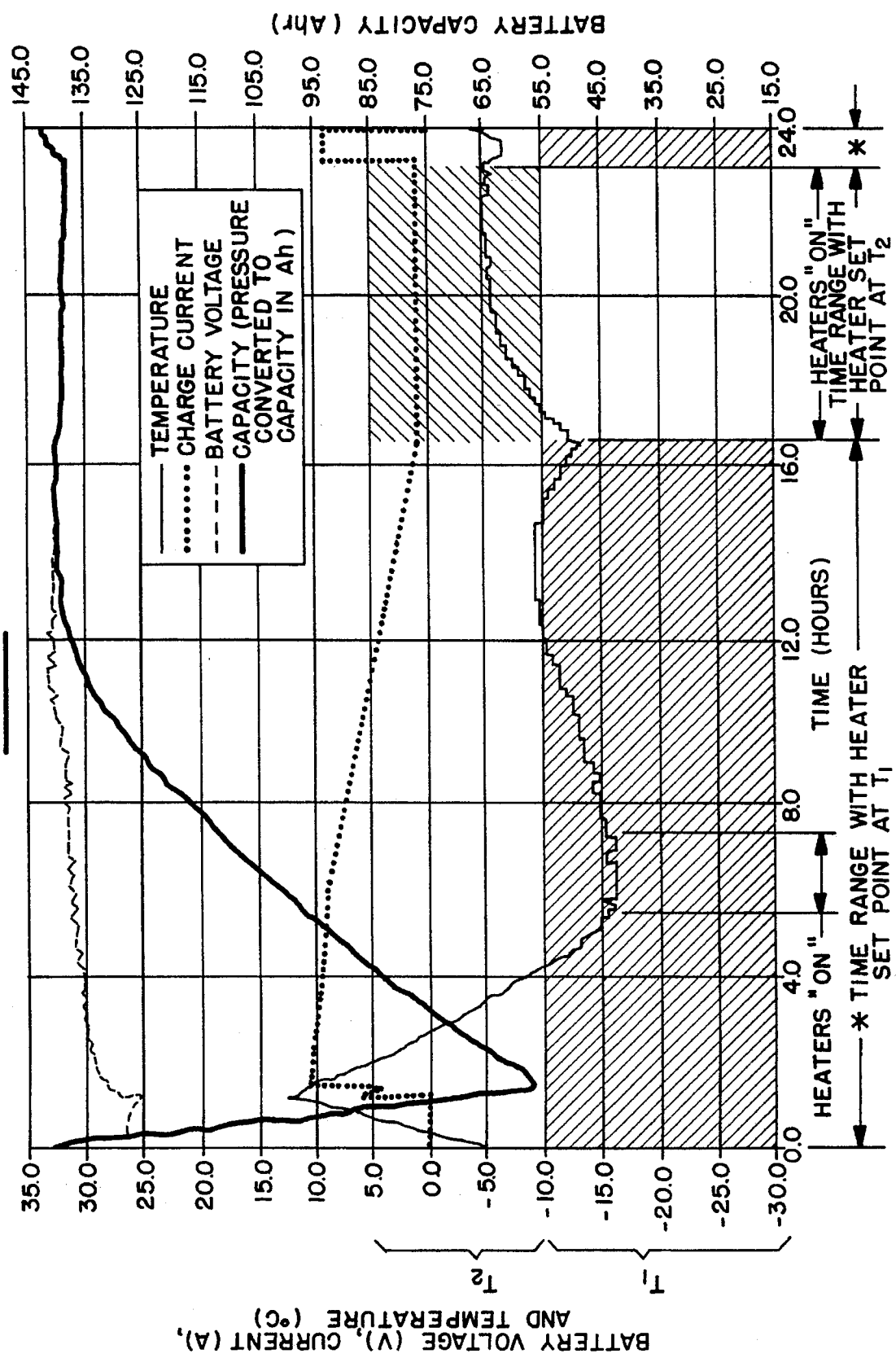
FIG. 1 is a graph illustrating a discharge and charge cycle for a $NiH_2$ battery operated in accordance with the invention.

Turn now to FIG. 1 which is a graph comprised of a set of curves which taken together embody the present invention. All of the curves share the same abscissa measured in time (hours) but have different ordinates depending upon the particular constituent being indicated.

Refer now to FIG. 1 which presents a single discharge and charge cycle employing the new profile of the invention. This 24-hour sequence may be repeated over and over again in the operation of a $NiH_2$ battery embodying the present invention. The discharge occurs first out to about one hour. The curves only show charge current, so a value of "zero" current is shown during the discharge. Discharge current is not shown, and would be off the scale on the left axis. Battery temperature rises steeply during the discharge, and cell pressure (converted to Ah capacity) drops quickly as the hydrogen reactant inside the battery cells is consumed during the discharge.

When charging begins, the charging current increases from zero, and pressure and voltage begin to climb while battery temperature begins to fall. $NiH_2$ batteries are initially endothermic during charging. Also, the battery is mounted on a spacecraft radiator panel that is sized to cool the battery appropriately during charging. The endothermic cooling plus the cooling from the radiators ensure that battery temperature drops to a set point minimum before the battery becomes exothermic later in charging. Battery heaters are turned on when the battery temperature approaches the set point minimum, and the heaters remain on until the battery temperature stabilizes and begins to rise as the battery becomes exothermic. Battery heaters may be energized in any suitable manner, electrically or otherwise. However, for purposes of discussion in the instant disclosure, they will be considered as being electrically energized.

The battery charging current starts to taper (linearly at about 6 or 7 hours) when the battery becomes exothermic in order to minimize the temperature rise and to allow more charge to be accepted by the battery at a lower temperature. At around 14 to 16 hours, the charging current has tapered to a low enough value that battery temperature actually starts to drop again from radiative cooling. After the taper charge, the battery starts its trickle charge period from about 16 to 17 hours as seen in FIG. 1. The heaters are turned on shortly after trickle charging starts in order to elevate the battery to the discharge temperature. A beginning of discharge temperature of about −10° C. to +5° C. is targeted. Within the last hour before discharge, the battery charge current is stepped to a high value in order to boost the battery capacity. Battery pressure and voltage jump upward during the current step, and temperature unexpectedly drops for the early part of the current step. The heaters are turned off just prior to the current step, so some of the temperature drop may be caused by the lack of heater power. However, the rapid temperature drop during a high current charging when heat should be generated by the battery also indicates that additional capacity is being stored. Capacity is increased 3% to 5% just from the current boost charge step.

While a preferred embodiment of the invention has been disclosed in detail, it should be understood by those skilled in the art that various other modifications may be made to the illustrated embodiment without departing from the scope of the invention as described in the specification and defined in the appended claims.

What is claimed is:

1. A method of charging a rechargeable nickel/hydrogen battery comprising the steps of:
   (a) applying a charging current to the battery resulting in a substantially full state of charge for the battery;
   (b) discharging the battery from the full state of charge thereof;
   (c) after a substantially full state of charge for the battery has been achieved in step (a) and for a duration up to approximately 60 minutes before the onset of step (b), applying to the battery a boost charging current at a rate in the range of approximately C to C/20 for at least a part of that duration.

2. A method of charging a rechargeable nickel/hydrogen battery as set forth in claim 1 wherein step (a) includes the step of:
   (d) applying to the battery a taper charging current before the onset of step (c) for minimizing temperature increase to the battery after the battery achieves a substantially full state of charge.

3. A method of charging a rechargeable nickel/hydrogen battery as set forth in claim 2 wherein step (d) includes the step of:
   (e) applying the taper charging current at a substantially linearly decreasing rate.

4. A method of charging a rechargeable nickel/hydrogen battery as Set forth in claim 2 including the step, at the end of step (d) and immediately before step (c), of:
   (e) applying a trickle charging current to the battery at a rate in the range of approximately c/80 to c/500.

5. A method of charging a rechargeable nickel/hydrogen battery as set forth in claim 1 including the step, at the end of step (a) and immediately before step (c), of:

(e) applying a trickle charging current to the battery at a rate in the range of approximately C/80 to C/500.

6. A method of charging a rechargeable nickel/hydrogen battery as set forth in claim 1 including the step of:

(d) concurrent with step (a) and prior to the time the battery temperature reaches a minimum value, $T_1$, temporarily applying heat to the battery for substantially stabilizing the temperature of the battery at said temperature $T_1$.

7. A method of charging a rechargeable nickel/hydrogen battery as set forth in claim 6 including the step of:

(e) after step (d) when the temperature of the battery begins to exceed said temperature $T_1$, terminating the application of heater current to the battery.

8. A method of charging a rechargeable nickel/hydrogen battery as set forth in claim 6 wherein said temperature $T_1$ of step (d) is in the range of approximately −10° C. to −30° C.

9. A method of charging a rechargeable nickel/hydrogen battery as set forth in claim 4 including the step of:

(f) during or after the onset of step (e), temporarily applying heater current to the battery to stabilize the battery temperature for discharge at a temperature in the range of about −10° C. to +5° C.

10. A method of charging a rechargeable nickel/hydrogen battery comprising the steps of:

(a) applying a charging current to the battery resulting in a substantially full state of charge for the battery;

(b) at about 70% to 95% of a full state of charge for the battery, initiating application to the battery of a linearly decreasing taper charge until a final desired recharge ratio is reached, the recharge ratio being the ratio of the quantity of charge as measured in ampere hours imparted to the battery to the quantity of charge as measured in ampere hours removed during a previous discharge; and (c) after step (b), applying to the battery a trickle charge current for a duration of at least approximately 30 minutes at a rate in the range of approximately C/80 to C/500 for a duration of at least approximately 30 minutes.

11. A method of charging a rechargeable nickel/hydrogen battery as set forth in claim 10 including the step of:

(d) discharging the battery from the substantially full state of charge achieved after completion of step (c).

12. A method of charging a rechargeable nickel/hydrogen battery as set forth in claim 10 including the steps of:

(d) for a duration up to approximately 60 minutes before the onset of discharging the battery, applying to the battery a boost charging current at a rate in the range of approximately C to C/20 for a duration of approximately 10 to 60 minutes.

13. A method of charging a rechargeable nickel-hydrogen battery comprising the step of:

(a) reaching a substantially full state of charge in a battery at a temperature $T_1$ between approximately −10° C. and −30° C. which is lower than a temperature $T_2$, in the range of approximately −10° C. to +5° C., at which discharge begins;

(b) discharging the battery from the full state of charge thereof; and (c) after a substantially full state of charge for the battery has been achieved in step (a) and approximately 10 to 60 minutes before the onset of step (b), applying to the battery a boost charging current at a rate in the range of approximately C to C/20 for a duration of approximately 10 to 60 minutes.

14. A method of charging a rechargeable nickel-hydrogen battery as set forth in claim 13 including the step, after step (a), of:

(d) heating the battery to the temperature $T_2$ in readiness for discharge.

15. A method of charging a rechargeable nickel/hydrogen battery as set forth in claim 13 wherein step (a) includes the step of:

(d) applying to the battery a taper charging current before the onset of step (b) for minimizing temperature increase to the battery after the battery achieves a substantially full state of charge.

16. A method of charging a rechargeable nickel/hydrogen battery as set forth in claim 15 wherein step (d) includes the step of:

(e) applying the taper charging current at a substantially linearly decreasing rate.

17. A method of charging a rechargeable nickel/hydrogen battery as set forth in claim 15 including the step, at the end of step (d) and immediately before step (c), of:

(e) applying a trickle charging current to the battery at a rate in the range of approximately C/80 to C/500.

18. A method of charging a rechargeable nickel/hydrogen battery as set forth in claim 13 including the step, at the end of step (a) and immediately before step (c), of:

(e) applying a trickle charging current to the battery at a rate in the range of approximately C/80 to C/500.

19. A method of charging a rechargeable nickel/hydrogen battery as set forth in claim 13 including the step of:

(d) concurrent with step (a) and prior to the time the battery temperature reaches $T_1$, temporarily applying heater current to the battery for substantially stabilizing the temperature of the battery at said temperature $T_1$; and (e) after step (d) when the temperature of the battery begins to exceed said temperature $T_1$, terminating the application of heater current to the battery.

20. A method of charging a rechargeable nickel/hydrogen battery as set forth in claim 13 including the steps of:

(d) at about 70% to 95% of a full state of charge for the battery, initiating application to the battery of a linearly decreasing taper charge until a final desired recharge ratio is reached, the recharge ratio being the ratio of the quantity of charge as measured in ampere hours imparted to the battery to the quantity of charge as measured in ampere hours removed during a previous discharge; and (e) after step (b), applying to the battery a trickle charge current for a duration of at least approximately 30 minutes.

\* \* \* \* \*